(12) United States Patent
Furman et al.

(10) Patent No.: US 7,737,893 B1
(45) Date of Patent: Jun. 15, 2010

(54) POSITIONING IN A SINGLE-FREQUENCY NETWORK

(75) Inventors: Scott Furman, Menlo Park, CA (US); Matthew Rabinowitz, Portola Valley, CA (US)

(73) Assignee: Rosum Corporation, Sunnyvale, CA (US)

( * ) Notice: Subject to any disclaimer, the term of this patent is extended or adjusted under 35 U.S.C. 154(b) by 173 days.

(21) Appl. No.: 11/770,162

(22) Filed: Jun. 28, 2007

Related U.S. Application Data (60) Provisional application No. 60/806,095, filed on Jun. 28, 2006.

(51) Int. Cl.
*G01S 3/02* (2006.01)

(52) U.S. Cl. .................. 342/464; 342/451; 342/458

(58) Field of Classification Search .............. 342/378, 342/464, 458, 451
See application file for complete search history.

(56) References Cited

U.S. PATENT DOCUMENTS

| | | | |
|---|---|---|---|
| 4,555,707 A | 11/1985 | Connelly | |
| 4,652,884 A | 3/1987 | Starker | |
| 4,700,306 A | 10/1987 | Wallmander | |
| 4,894,662 A | 1/1990 | Counselman | |
| 5,045,861 A | 9/1991 | Duffett-Smith | |
| 5,157,686 A | 10/1992 | Omura et al. | |
| 5,166,952 A | 11/1992 | Omura et al. | |
| 5,271,034 A | 12/1993 | Abaunza | |
| 5,323,322 A | 6/1994 | Mueller et al. | |
| 5,398,034 A | 3/1995 | Spilker, Jr. | |
| 5,481,316 A | 1/1996 | Patel | |
| 5,504,492 A | 4/1996 | Class et al. | |
| 5,510,801 A | 4/1996 | Engelbrecht et al. | |
| 5,604,765 A | 2/1997 | Bruno et al. | |
| 5,630,206 A | 5/1997 | Urban et al. | |
| 5,648,982 A | 7/1997 | Durrant et al. | |
| 5,774,829 A | 6/1998 | Cisneros et al. | |
| 5,784,339 A | 7/1998 | Woodsum et al. | |
| 5,835,060 A | 11/1998 | Czarnecki et al. | |

(Continued)

FOREIGN PATENT DOCUMENTS

DE    3242997 A1    5/1984

(Continued)

OTHER PUBLICATIONS

Parkinson, B.W., et al., "Autonomous GPS Integrity Monitoring Using the Pseudorange Residual," *Journal of the Institute of Navigation* (1988), vol. 35, No. 2, pp. 255-274.

(Continued)

*Primary Examiner*—Thomas H Tarcza
*Assistant Examiner*—Cassi Galt
(74) *Attorney, Agent, or Firm*—Richard A. Dunning, Jr.

(57) ABSTRACT

Apparatus having corresponding methods and computer-readable media comprise a receiver adapted to receive a plurality of single-frequency network (SFN) signals at a predetermined frequency; a correlator adapted to correlate the SFN signals with a predetermined reference signal, wherein correlating produces a plurality of correlation peaks; a grouper circuit adapted to group the correlation peaks into arrival groups such that the correlation peaks in different arrival groups are known to be from different transmitters; and a selection circuit adapted to select the earliest correlation peak in each arrival group as a leading correlation peak.

24 Claims, 5 Drawing Sheets

U.S. PATENT DOCUMENTS

| | | | |
|---|---|---|---|
| 5,920,284 | A | 7/1999 | Victor |
| 5,952,958 | A | 9/1999 | Speasl et al. |
| 5,953,311 | A | 9/1999 | Davies et al. |
| 6,006,097 | A | 12/1999 | Hornfeldt et al. |
| 6,016,119 | A | 1/2000 | Krasner |
| 6,078,284 | A | 6/2000 | Levanon |
| 6,094,168 | A | 7/2000 | Duffett-Smith et al. |
| 6,107,959 | A | 8/2000 | Levanon |
| 6,137,441 | A | 10/2000 | Dai et al. |
| 6,147,642 | A | 11/2000 | Perry et al. |
| 6,181,921 | B1 | 1/2001 | Konisi et al. |
| 6,184,921 | B1 | 2/2001 | Limberg |
| 6,201,497 | B1 | 3/2001 | Snyder et al. |
| 6,215,778 | B1 | 4/2001 | Lomp et al. |
| 6,289,280 | B1 | 9/2001 | Fernandez-Corbaton et al. |
| 6,317,452 | B1 | 11/2001 | Durrant et al. |
| 6,317,500 | B1 | 11/2001 | Murphy |
| 6,373,432 | B1 | 4/2002 | Rabinowitz et al. |
| 6,374,177 | B1 | 4/2002 | Lee et al. |
| 6,400,753 | B1 | 6/2002 | Kohli et al. |
| 6,433,740 | B1 | 8/2002 | Gilhousen |
| 6,437,832 | B1 | 8/2002 | Grabb et al. |
| 6,484,034 | B1* | 11/2002 | Tsunehara et al. ....... 455/456.6 |
| 6,522,297 | B1 | 2/2003 | Rabinowitz et al. |
| 6,559,800 | B2 | 5/2003 | Rabinowitz et al. |
| 6,590,529 | B2 | 7/2003 | Schwoegler |
| 6,646,603 | B2 | 11/2003 | Dooley et al. |
| 6,717,547 | B2 | 4/2004 | Spilker, Jr. et al. |
| 6,727,847 | B2 | 4/2004 | Rabinowitz et al. |
| 6,735,185 | B1* | 5/2004 | Noneman .................. 370/335 |
| 6,753,812 | B2 | 6/2004 | Rabinowitz et al. |
| 6,806,830 | B2 | 10/2004 | Panasik et al. |
| 6,839,024 | B2 | 1/2005 | Spilker, Jr. et al. |
| 6,859,173 | B2 | 2/2005 | Spilker, Jr. et al. |
| 6,861,984 | B2 | 3/2005 | Rabinowitz et al. |
| 6,879,286 | B2 | 4/2005 | Rabinowitz et al. |
| 6,914,560 | B2 | 7/2005 | Spilker, Jr. et al. |
| 6,917,328 | B2 | 7/2005 | Rabinowitz et al. |
| 6,937,866 | B2 | 8/2005 | Duffett-Smith et al. |
| 6,952,182 | B2 | 10/2005 | Spilker, Jr. et al. |
| 6,961,020 | B2 | 11/2005 | Rabinowitz et al. |
| 6,963,306 | B2 | 11/2005 | Spilker, Jr. et al. |
| 6,970,132 | B2 | 11/2005 | Spilker, Jr. et al. |
| 7,042,396 | B2 | 5/2006 | Omura et al. |
| 7,042,949 | B1 | 5/2006 | Omura et al. |
| 7,126,536 | B2 | 10/2006 | Rabinowitz et al. |
| 7,133,434 | B1* | 11/2006 | Toskala et al. .............. 375/148 |
| 7,260,378 | B2 | 8/2007 | Holland et al. |
| 7,355,993 | B2* | 4/2008 | Adkins et al. ............... 370/318 |
| 7,372,405 | B2 | 5/2008 | Rabinowitz et al. |
| 7,463,195 | B2 | 12/2008 | Rabinowitz et al. |
| 2002/0122003 | A1 | 9/2002 | Patwari et al. |
| 2002/0184653 | A1 | 12/2002 | Pierce et al. |
| 2002/0199196 | A1 | 12/2002 | Rabinowitz et al. |
| 2003/0157892 | A1* | 8/2003 | Reznik et al. ................. 455/65 |
| 2003/0162547 | A1 | 8/2003 | McNair |
| 2003/0222819 | A1* | 12/2003 | Karr et al. .................... 342/457 |
| 2004/0073914 | A1 | 4/2004 | Spilker et al. |
| 2004/0201779 | A1 | 10/2004 | Spilker et al. |
| 2005/0066373 | A1 | 3/2005 | Rabinowitz |
| 2005/0251844 | A1 | 11/2005 | Martone et al. |
| 2007/0050824 | A1 | 3/2007 | Lee et al. |
| 2007/0121555 | A1 | 5/2007 | Burgess et al. |
| 2007/0131079 | A1 | 6/2007 | Opshaug et al. |
| 2007/0182633 | A1 | 8/2007 | Omura et al. |
| 2007/0296632 | A1 | 12/2007 | Opshaug et al. |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.

Spilker, Jr., J.J., "Fundamentals of Signal Tracking Theory," *Global Positioning System: Theory and Applications* (1994), vol. 1, Chapter 7, pp. 245-327.

Van Dierendock, A.J., "GPS Receivers," *Global Positioning System: Theory and Applications* (1995), vol. 1, Chapter 8, pp. 329-407.

Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.

Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

\* cited by examiner

POSITIONING IN A SINGLE-FREQUENCY NETWORK

CROSS-REFERENCE TO RELATED APPLICATIONS

This application claims benefit of U.S. Provisional Patent Application Ser. No. 60/806,095 filed Jun. 28, 2006, the disclosure thereof incorporated by reference herein in its entirety.

BACKGROUND

The present invention relates generally to broadcast single-frequency networks (SFNs). More particularly, the present invention relates to positioning based on signals received from SFN transmitters.

SUMMARY

In general, in one aspect, the invention features an apparatus comprising: a receiver adapted to receive a plurality of single-frequency network (SFN) signals at a predetermined frequency; a correlator adapted to correlate the SFN signals with a predetermined reference signal, wherein correlating produces a plurality of correlation peaks; a grouper circuit adapted to group the correlation peaks into arrival groups such that the correlation peaks in different arrival groups are known to be from different transmitters; and a selection circuit adapted to select the earliest correlation peak in each arrival group as a leading correlation peak.

Some embodiments comprise a spread circuit adapted to select an expected maximum channel delay spread for the SFN signals. In some embodiments, the grouper circuit forms the arrival groups by placing the correlation peaks separated by more than twice the expected maximum channel delay spread into separate ones of the arrival groups. Some embodiments comprise a position circuit adapted to determine one or more possible positions of the apparatus based on one or more of the leading correlation peaks. Some embodiments comprise a candidate circuit adapted to identify a plurality of candidate transmitters of the SFN signals; and a match circuit adapted to match the leading correlation peaks with the candidate transmitters based on locations of the candidate transmitters. Some embodiments comprise a position circuit to determine one or more possible positions of the apparatus based on an output of the match circuit and the locations of the candidate transmitters.

In general, in one aspect, the invention features an apparatus comprising: means for receiving a plurality of single-frequency network (SFN) signals at a predetermined frequency; means for correlating the SFN signals with a predetermined reference signal, wherein correlating produces a plurality of correlation peaks; means for grouping the correlation peaks into arrival groups such that the correlation peaks in different arrival groups are known to be from different transmitters; and means for selecting the earliest correlation peak in each arrival group as a leading correlation peak. Some embodiments comprise second means for selecting an expected maximum channel delay spread for the SFN signals. In some embodiments, the means for grouping forms the arrival groups by placing the correlation peaks separated by more than twice the expected maximum channel delay spread into separate ones of the arrival groups. Some embodiments comprise means for determining one or more possible positions of the apparatus based on one or more of the leading correlation peaks. Some embodiments comprise means for identifying a plurality of candidate transmitters of the SFN signals; and means for matching the leading correlation peaks with the candidate transmitters based on locations of the candidate transmitters. Some embodiments comprise means for determining one or more possible positions of the apparatus based on an output of the means for matching and the locations of the candidate transmitters.

In general, in one aspect, the invention features a method comprising: receiving a plurality of single-frequency network (SFN) signals at a predetermined frequency; correlating the SFN signals with a predetermined reference signal, wherein correlating produces a plurality of correlation peaks; grouping the correlation peaks into arrival groups such that the correlation peaks in different arrival groups are known to be from different transmitters; and selecting the earliest correlation peak in each arrival group as a leading correlation peak.

Some embodiments comprise selecting an expected maximum channel delay spread for the SFN signals. In some embodiments, the correlation peaks separated by more than twice the expected maximum channel delay spread are placed into separate arrival groups. Some embodiments comprise determining one or more possible positions of an apparatus receiving the SFN signals based on the one or more of the leading correlation peaks. Some embodiments comprise identifying a plurality of candidate transmitters of the SFN signals; and matching the leading correlation peaks with the candidate transmitters based on locations of the candidate transmitters. Some embodiments comprise determining one or more possible positions of an apparatus receiving the SFN signals based on the matching and the locations of the candidate transmitters.

In general, in one aspect, the invention features computer-readable media embodying instructions executable by a computer to perform a method comprising: correlating a plurality of single-frequency network (SFN) signals received at a predetermined frequency with a predetermined reference signal, wherein correlating produces a plurality of correlation peaks; grouping the correlation peaks into arrival groups such that the correlation peaks in different arrival groups are known to be from different transmitters; and selecting the earliest correlation peak in each arrival group as a leading correlation peak.

In some embodiments, the method further comprises: selecting an expected maximum channel delay spread for the SFN signals. In some embodiments, the correlation peaks separated by more than twice the expected maximum channel delay spread are placed into separate arrival groups. In some embodiments, the method further comprises: determining one or more possible positions of an apparatus receiving the SFN signals based on the one or more of the leading correlation peaks. In some embodiments, the method further comprises: identifying a plurality of candidate transmitters of the SFN signals; and matching the leading correlation peaks with the candidate transmitters based on locations of the candidate transmitters. In some embodiments, the method further comprises: determining one or more possible positions of an apparatus receiving the SFN signals based on the matching and the locations of the candidate transmitters.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Positioning receivers that are based on time-of-flight, such as GPS, rely on extremely precise measurements of signal arrival time from multiple transmitter sites. Each relative time-of-flight measurement, when combined with the propagation speed of the signal and precise knowledge of transmitter positions, represents a constraint on the possible receiver location. An estimate of position can be formed by combining several such constraints.

This approach to positioning has been considered unfeasible for broadcast transmissions that use SFN technology, such as typical with DVB, ISDB-T, DAB, and A-VSB networks. In an SFN network, geographically dispersed transmitters emit time-synchronized replica signals. Hence, the signals arriving from different towers are not distinguishable and it is not straightforward to associate the arrival of particular quanta of signal energy with any particular transmitter site.

The situation is made even more difficult by multipath, in which a signal may reflect and refract as it transits to the receiver along many different paths, each of which may overlap and either cancel or obscure the arrivals of weaker signals from other transmitters.

Even in the non-SFN case (when each transmitter is assigned a unique frequency and therefore there is no cross-transmitter overlap), the presence of multipath introduces error into the position calculation. This is because the accuracy of positioning is determined, in part, by the accuracy of the estimated pseudoranges between transmitter and receiver. The accuracy of the pseudoranges, in turn, relies on the measurement of the arrival time of the direct path energy. An attenuating or reflecting obstacle that is interposed between the two can prevent detection of the direct path by the receiver. Additionally, scatterers can smear the signal energy out and cause fading, making it difficult to temporally localize the arrival of direct path energy. Despite these issues, the earliest detected energy of a transmitter's signal is generally used as the best initial estimate of the direct path arrival time.

This invention seeks to generate either a position or a set of possible positions for a receiver by taking into account the geometric constraints imposed by relative receiver and transmitter locations. This is achieved by fully or partially resolving the ambiguity in determining which detected signal represents an early path and from which transmitter the signal emanated.

It is assumed that the positions of all transmitters which could possibly be detected by the positioning receiver are known at the time of each attempted position fix. It is important that the identified candidate transmitters are a superset of the actually detected transmitters. Since it is beneficial to limit these candidate transmitters to as small a number as possible, however, it is also assumed that the rough location of the receiver is known. This rough location could be determined by any number of methods, such as by means of demodulating cellular base station transmissions or fingerprinting nearby wireless signals, e.g. cellular or TV base stations.

The distribution of RF signal delays at a receiver is particular to a given reception scenario and depend on a variety of environmental and radio design factors, such as the transmitter and receiver heights, radiation patterns of the antenna, the amount of nearby natural and man-made scatterers, terrain and so forth. Nonetheless, numerous statistical channel models have been created to characterize the statistical distribution of signal arrival times and powers in different types of macro-environments. For example, COST 259 defines PDPs (Power-delay profiles) for urban, suburban and rural environments. The PDP defines the power envelope of the received signal as a function of elapsed time since arrival of the direct path. With the COST 259 model, for example, the envelope consists of one or more exponentially decaying probability curves and the power of the path at a given delay offset has a Rayleigh temporal distribution proportional to the envelope.

Although channel models are numerous and varied, they all can be described by a characteristic delay spread, an estimate of time between the arrival of the earliest detected path and the latest detected path. Typically, the RMS delay spread is cited as a defining characteristic of either a channel or channel model. In the context of this invention, the maximum channel delay spread is the parameter of interest instead, describing the maximum possible time between the arrival of the earliest detected path and the latest detected path.

One method of estimating the arrival time of a wideband signal is to correlate against a reference waveform known to be present in the signal to be detected. This results in a processing gain against Gaussian noise that is proportional to the product of the signal's bandwidth and the duration of the reference signal. For example, one could use the scattered or continuous pilots as a reference waveform for a DVB signal. The output of this correlator is a direct estimate of the signal energy versus its time of arrival.

It is useful to distinguish between noise energy and signal energy. There are numerous ways to accomplish this known to those skilled in the art. One of the simplest is to examine the RMS value of the correlator output over a temporal region far from the peak correlator output. This represents the noise floor of the measurement. Assuming all noise is of a Gaussian distribution, a detection threshold can be set as a multiple of the noise floor. All received power higher than the threshold is classified as signal and received power less than the threshold is classified as noise. Any post-correlator energy peak that is classified as signal (rather than noise) is also referred to as a correlation peak.

The higher the detection threshold, the less likelihood that a noise peak would be incorrectly classified as signal energy, i.e. a "false alarm", but the more likely it is that true signal energy would be misclassified as noise. It is well-known how to compute a detection threshold in Gaussian noise for any desired CFAR (Constant False Alarm Rate).

Having classified portions of the correlator output as signal and other parts as noise, the next step is to separate the correlator peaks into "arrival groups". As defined here, peaks that are in different arrival groups are guaranteed to have been emitted by different SFN transmitters, although the converse is not true: Peaks in the same arrival group are not guaranteed to be from the same transmitter.

Conceptually, we differentiate between detectable peaks, as predicted by a channel model, and those peaks actually detected by the receiver, reflecting the instantaneous channel behavior. Consider the case of non-overlapping signal energy arriving from two transmitters. Let M be the maximum channel delay spread predicted by the model. The delay spread of each received transmitter's signal, should be in the range [0, M]. Let $d_i$ be the delay between the nominal arrival time of the transmitter's direct path and the earliest detected peak for transmitter i, which will be in the range [0, D]. If two peaks from transmitters i and j are separated by an interval of at least $(M-m_i+d_j)$, then the two peaks are guaranteed to be from different transmitters and are placed in different arrival groups. In the worst case, $m_i$ is equal to zero and $d_j$ is equal to M, i.e. both transmitters are received with zero delay spread, but one of the peaks represents the direct path of one transmitter and the second peak represents the most delayed path of the second transmitter. To be conservative, therefore, peaks should be separated into a different arrival group if their arrival times are larger than 2M, twice the maximum predicted delay spread of the channel.

The earliest path of any arrival group also represents the earliest path of at least one transmitter represented within the arrival group, designated the TOA (Time of Arrival). Since more than one transmitter's energy might be incorporated into the same arrival group, the number of arrival groups created, k, is necessarily less than or equal to k', the number of transmitters from which signals were received. That number, in turn, is less than N, the number of candidate transmitters.

At this point, the TOA of the earliest paths for k transmitters are known, allowing up to k−1 independent TDOA (Time Difference of Arrival) equations to be formed. Let $TOA_i$ be the estimated signal Time of Arrival for transmitter i and let c be the speed of the signal in the medium and R represents the distance between transmitter and receiver. Then, one such set of linearly independent equations would be:

$$c(TOA_1 - TOA_j) - (R1 - Rj) = 0 \quad 2 \leq j \leq k \quad (1)$$

There are numerous known ways to solve such a set of equations, but the commonest technique is to linearize R in terms of the XYZ coordinates of the transmitters and employ an iterative least-squares method until the residual values on the right hand size have been minimized. The usual metric for goodness of solution fit is SSE (Squared residual Sum of Errors) across all equations.

The difficulty in generating a set of equations such as in equation (1) is that it is necessary to associate each discovered TOA with its transmitter in order to compute the constant R, the range between the transmitter and receiver. Given N candidate transmitters and k TOAs, the possible number of transmitter permutations is:

$$\frac{N!}{K!(N-K)!} \quad (2)$$

Every one of the transmitter permutations counted by equation (2) can be substituted into equation (1), each one generating a new set of linearly independent equations. The next step, then, is to determine which of these many possibilities meets the constraints of the transmitter geometry and thus represents a probable position solution.

First, a threshold SSE is chosen which represents a maximum likely SSE value assuming that the only contributor to error is TOA estimation errors (and not an incorrect transmitter permutation). Second, the SSEs of the solutions to all permutations of equation (1) are compared against this threshold value. Permutations with SSE below the threshold value represent candidate positioning solutions.

In the event that only a single permutation of transmitters has SSE below the threshold value, then the corresponding position solution represents the most likely position of the receiver. If there are multiple matching permutations, then the constraints formed by the resulting sets of equations in (1) may be combined with other, external constraints to generate a position fix.

Embodiments of the present invention provide positioning in single-frequency networks (SFN). Embodiments of the present invention can be used with coded orthogonal frequency-division multiplexing (COFDM) SFN signals such as digital video broadcasting—handheld (DVB-H) signals, as well as with non-COFDM signals that are transmitted in a single frequency network.

Figure 1:
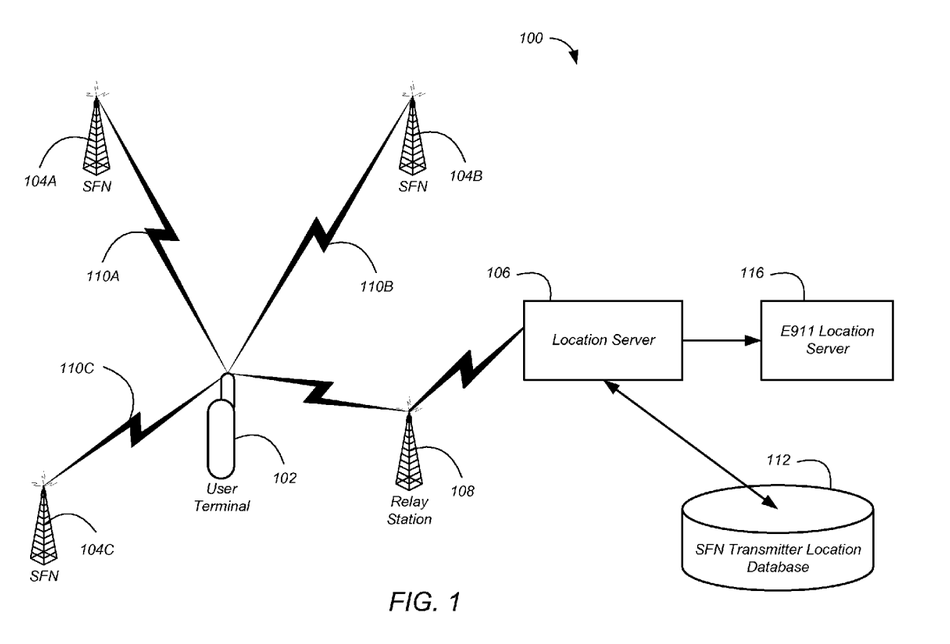
FIG. 1 shows a communication system comprising a user terminal receiving SFN signals from a plurality of SFN transmitters in an SFN network according to an embodiment of the present invention.

FIG. 1 shows a communication system 100 comprising a user terminal 102 receiving SFN signals 110A-C from a plurality of respective SFN transmitters 104A-C in an SFN network according to an embodiment of the present invention. Although in the described embodiments, the elements of communication system 100 are presented in one arrangement, other embodiments may feature other arrangements, as will be apparent to one skilled in the relevant arts based on the disclosure and teachings provided herein. For example, the elements of communication system 100 can be implemented in hardware, software, or combinations thereof.

The phrase "user terminal" is meant to refer to any object capable of implementing the techniques described herein. Examples of user terminals include PDAs, mobile phones, cars and other vehicles, and any object which could include a chip or software implementing the techniques described herein. Further, the term "user terminal" is not intended to be limited to objects which are "terminals" or which are operated by "users."

In some embodiments, user terminal 102 performs the techniques described herein. In other embodiments, some or all of the techniques are performed by a location server 106 based on data collected by user terminal 102 and relayed by a relay station 108 such as a cellular base station and the like. The locations of SFN transmitters 104 can be stored in a SFN transmitter location database 112. The location of user terminal 102 can be transmitted to an E911 location server 116 for emergencies.

Figure 2:
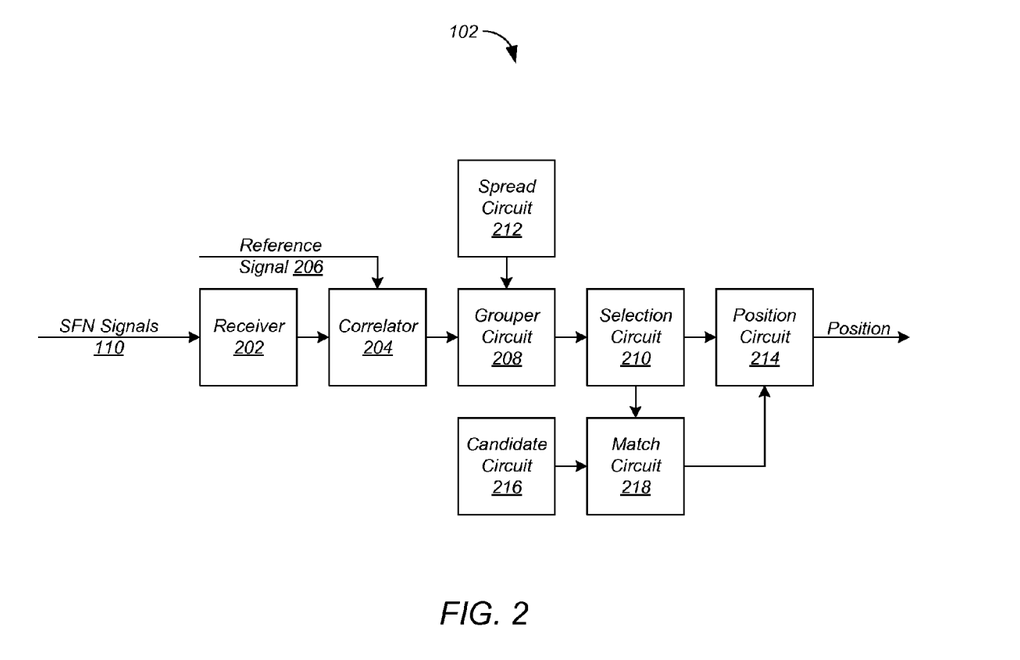
FIG. 2 shows detail of the user terminal of FIG. 1 according to an embodiment of the present invention.

FIG. 2 shows detail of user terminal 102 of FIG. 1 according to an embodiment of the present invention. Referring to FIG. 2, user terminal 102 includes a receiver 202 adapted to receive a plurality of SFN signals 110 at a predetermined frequency, a correlator 204 adapted to correlate the SFN signals 110 with a predetermined reference signal 206 to produce a plurality of correlation peaks, a grouper circuit 208 adapted to group the correlation peaks into arrival groups such that correlation peaks in different arrival groups are known to be from different transmitters, e.g. where the arrival groups are separated by at least twice an expected maximum channel delay spread, and a selection circuit 210 adapted to select the earliest peak in each arrival group as a leading correlation peak. User terminal 102 can also include a spread circuit 212 adapted to select the expected maximum channel delay spread for SFN signals 110 and a position circuit 214 adapted to determine a position of user terminal 102 based on the leading correlation peaks.

User terminal 102 can also include a candidate circuit 216 adapted to identify a plurality of candidate transmitters 104 of SFN signals 110, and a match circuit 218 adapted to match the leading correlation peaks with the candidate transmitters 104 based on locations of candidate transmitters 104. Position circuit 214 can determine the position of user terminal 102 based on the output of match circuit 218 and the locations of candidate transmitters 104.

Although in the described embodiments, the elements of user terminal 102 are presented in one arrangement, other embodiments may feature other arrangements, as will be apparent to one skilled in the relevant arts based on the disclosure and teachings provided herein. For example, the elements of user terminal 102 can be implemented in hardware, software, or combinations thereof. As another example, some of the elements of user terminal 102 can be implemented in location server 106 of FIG. 1.

Figure 3:
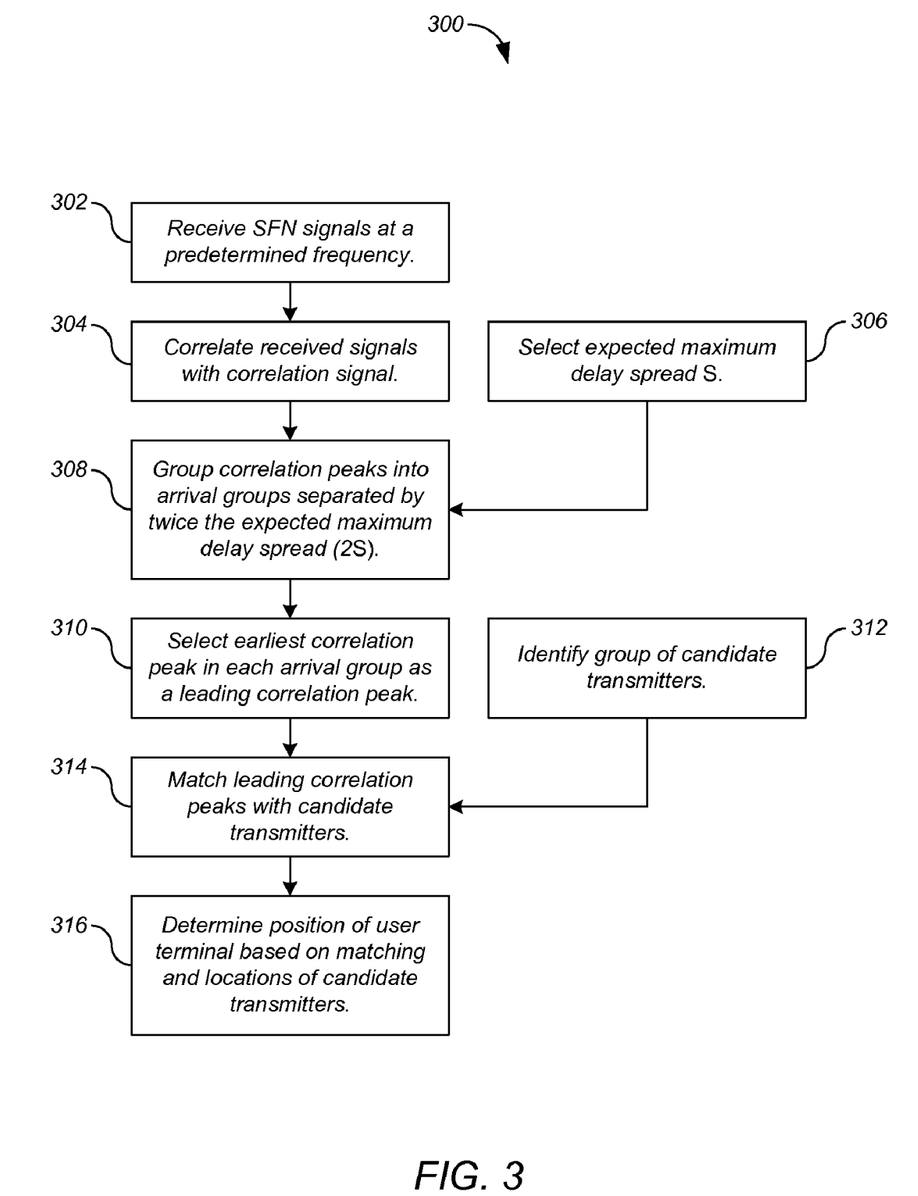
FIG. 3 shows a process for the user terminal of FIG. 2 according to an embodiment of the present invention.

FIG. 3 shows a process 300 for user terminal 102 of FIG. 2 according to an embodiment of the present invention. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

Referring to FIG. 3, receiver 202 receives a plurality of SFN signals 110 at a predetermined frequency (step 302). The predetermined frequency can be selected by any means. For example, receiver 202 receives a plurality of signals on a single 6 MHz DVB-H channel. Correlator 204 correlates the received signals with reference signal 206 (step 304), thereby generating a series of correlation peaks. Reference signal 206 represents a repeating pattern in SFN signals 110, as is well-known in the relevant arts. In some embodiments, correlator 204 processes signals 110 in real time. In other embodiments, correlator 204 processes a previously-stored version of signals 110.

Each transmitter 104 on the channel generates a cluster of correlation peaks within a particular time window determined by multipath delay spread. If two clusters of correlation peaks are separated by more than twice an expected delay spread S for a channel, the clusters represent separate transmitters 104. Spread circuit 212 selects the expected maximum channel delay spread S for SFN signals 110 (step 306). The expected maximum channel delay spread S can be selected by any means. For example, the expected maximum channel delay spread S can be selected empirically for an environment based on previous observations of the environment.

Figure 4:
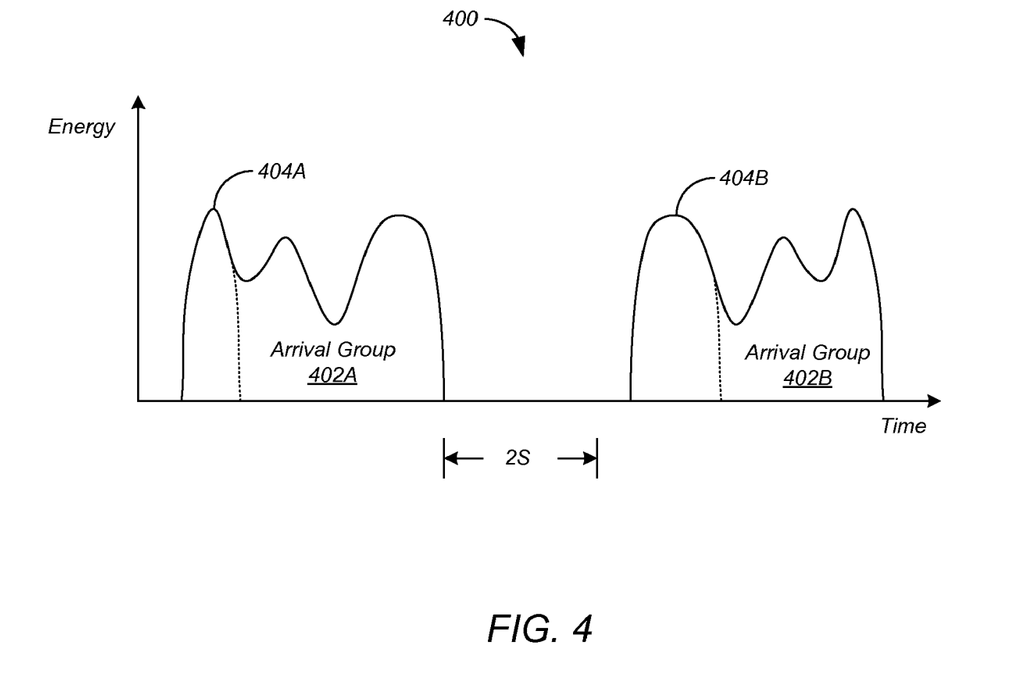
FIG. 4 shows an example correlation output of the correlator of FIG. 2.

Grouper circuit 208 groups the correlation peaks into arrival groups that are separated by at least twice the expected maximum channel delay spread S (step 308). FIG. 4 shows an example correlation output 400 of correlator 204. Referring to FIG. 4, correlation output 400 includes two clusters of correlation peaks 402. Because the clusters of correlation peaks are separated by more than twice the expected maximum channel delay spread S, grouper circuit 208 groups the clusters of correlation peaks 402 into two arrival groups 402A,B.

Selection circuit 210 selects the earliest correlation peak 402 in each arrival group as a leading correlation peak (step 310). The remaining correlation peaks 402 in each arrival group can be discarded as multipath signals. For example, referring to FIG. 4, selection circuit 210 selects correlation peak 404A in arrival group 402A, and correlation peak 404B in arrival group 402B, as leading correlation peaks.

At this point in process 300, a number of leading correlation peaks 404 have been identified, but have not been matched to their respective transmitters 104. Candidate circuit identifies a group of candidate transmitters 104 (step 312). The candidate transmitters 104 can be identified by any means. For example, the candidate transmitters 104 can be identified empirically for an environment based on previous observations of the environment.

Match circuit 218 matches the leading correlation peaks 404 selected by selection circuit 210 with the candidate transmitters 104 identified by candidate circuit 216 based on the locations of the candidate transmitters 104 (step 314). For K leading correlation peaks 404 and N candidate transmitters 104, the number of possible combinations is given by $$\frac{N!}{K!(N-K)!} \tag{3}$$

Figure 5:
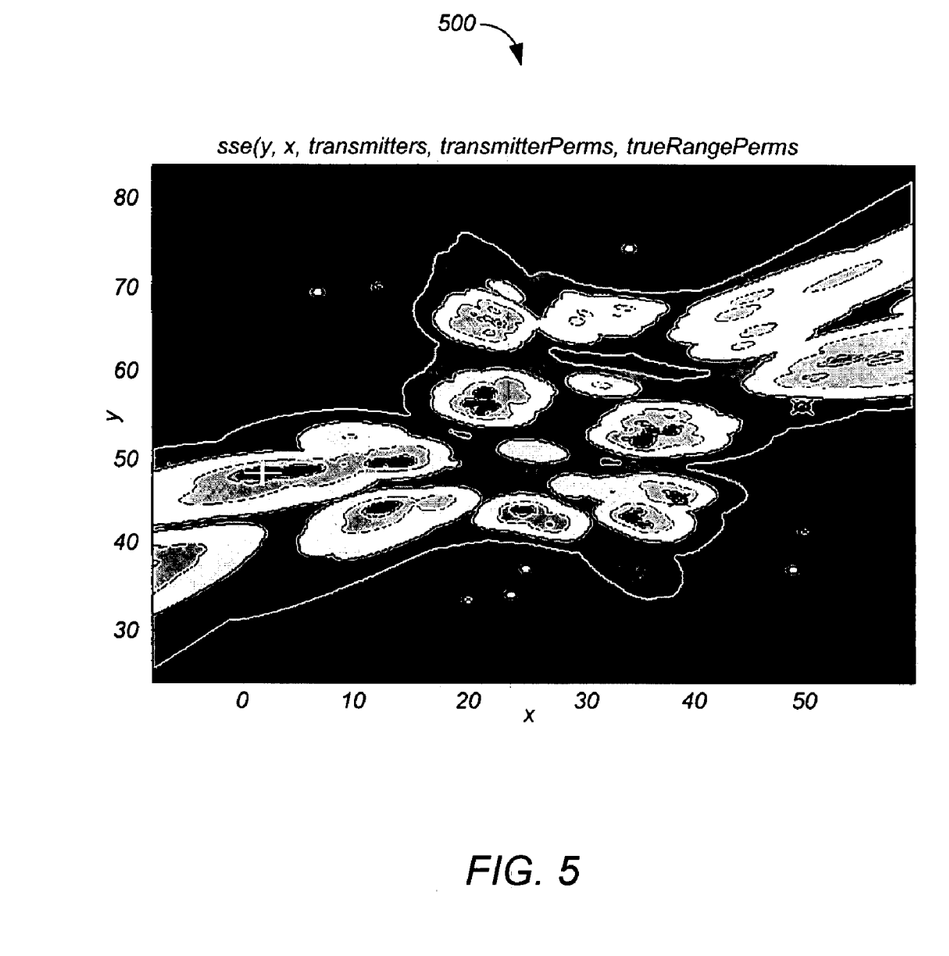
FIG. 5 shows a geographical plot of time-of-arrival residuals for an example matching process.

Match circuit 218 can match leading correlation peaks 404 with candidate transmitters 104 according to any process. For example, match circuit 218 can perform a time-of-arrival position computation for every combination, and select the matching combination based on the residuals of those computations, using techniques that are well-known in the relevant art. The combination that generates the smallest residual is the most likely combination. FIG. 5 shows a geographical plot 500 of time-of arrival residuals for an example matching process. In plot 500, darker grays represent lower residuals while lighter grays represents higher residuals. White circles represent transmitters 104. Circles with superimposed X's represent transmitters 104 that are not used either because their signals 110 were not received, or because their signals 110 could not be isolated in an arrival group 404. The white X represents the true location of user terminal 102. Distances are given in km.

Referring to FIG. 5, the nearest minimum residual to user terminal 102 is roughly 3 km away. The ambiguity between the true position and the nearest minimum residual can be resolved using additional data that resolves position to within roughly 1 km. The additional information need not provide positioning in and of itself. Additional signals can be used to provide a measurement that is included in the positioning computation to generate the residual. This additional information reduces or eliminates the ambiguity that results from using SFN signals alone. For example, additional signals can include time of arrival measurements from GPS, ATSC, NTSC, DVB-T, cellular signals, WiFi signals, other COFDM signals, and the like, as well as power measurements on ATSC, NTSC, DVB-T, DVB-H, WiFi other COFDM signals, and the like.

Referring again to FIG. 3, position circuit 214 determines the position of user terminal 102 based on the output of match circuit 218 and the locations of candidate transmitters 104 (step 316). Match circuit 218 has matched the leading correlation peaks 404 with some or all of candidate transmitters 104. Each of the leading correlation peaks 404 can be used to generate a pseudorange relative to the matching candidate transmitter 104. If enough such pseudoranges are available, position circuit 214 can determine the position of user terminal 102 based only on the received SFN signals. If not enough such pseudoranges are available, position circuit 214 can employ other additional information, such as described above, to determine the position of user terminal 102.

The matlab code below provides a simulation used to generate plot 500 of FIG. 5, and is provided by way of illustration, not limitation.

```
function sfn(numTransmitters, numReceived)
    % Analysis grid dimensions, in km
```

```
extent=100;
% Construct random x, y coordinates of transmitters
transmitters=(rand(1,    numTransmitters)+rand(1,
numTransmitters)*i)*extent/2+extent/4;
% transmitters=[30+i, 70+30i, 50+70i];
% Choose random location for user
user=(rand+rand*i)*extent/2+extent/4;
% Determine interesting region to plot
allXCoords=[imag(transmitters), imag(user)];
minXCoord=min(allXCoords);
maxXCoord=max(allXCoords);
allYCoords=[real(transmitters), real(user)];
minYCoord=min(allYCoords);
maxYCoord=max(allYCoords);
plotRange=round([minXCoord-10,  maxXCoord+10,
minYCoord-10, maxYCoord+10]);
  R=5;
  zoomedPlotRange=round([imag(user)-R, imag(user)+R,
real(user)-R, real(user)+R]);
  figure(1);
  hold off;
  % plotToaCount(transmitters, plotRange);
  plotSSE(user, transmitters, numReceived, plotRange);
  hold on;
  zLim=get(gca, 'ZLim');
  zMax=zLim(2);
  overlayPlotUser(user, zMax);
  overlayPlotTransmitters(transmitters,    numReceived,
zMax);
  % figure(2);
  % plotSSE(user, transmitters, numReceived, zoomed-
PlotRange);
  %%%%%%%%%%%%%%%%%%%%%%%%%%%%%%%%
  %%%%%%%%%%%%%%%%%%%%%%%%%%%%%%%%
  %%%%%%%%%%%%%%%%%%%%%%%%%%%%
  function plotToaCount(transmitters, plotRange)
  fh=@(x,y) toaCount(x, y, transmitters);
  h=ezcontourf(fh, plotRange, 200);
  colorbar( )
  colormap([[0 0 0]; jet]);
  % view([0 90]);
  set(h, 'LineStyle', 'none');
  set(h, 'LevelStep', 0.1);
  plotCoords=[plotRange(1):plotRange(2)];
  % for x=plotCoords
  % for y=plotCoords
  % count=toaCount(x, y, transmitters);
  % if (count<4)
  % count=0;
  % end
  % Z(x-plotRange(1)+1, y-plotRange(1)+1)=count;
  % end
  % end
  % shading interp;
  % h=pcolor(plotCoords, plotCoords, Z);
  % set(h, 'Line', 'none');
  %%%%%%%%%%%%%%%%%%%%%%%%%%%%%%%%
  %%%%%%%%%%%%%%%%%%%%%%%%%%%%%%%%
  %%%%%%%%%%%%%%%%% %%%%%%%%%
  % Return the number of distinct leading peaks available at
a given receiver
  % location
  function count=toaCount(x, y, transmitters)
  ranges=calcRanges([x y]', transmitters);
  numTransmitters=length(transmitters);
  % Maximum delay spread at RX, in km
  maxDelaySpread=1;
  count=numTransmitters;
  for i=1:numTransmitters-1
  range=ranges(i);
  rest=ranges(i+1:end);
  number_overlap=sum((range<(rest+2*maxDelay-
Spread)) & (range>(rest-2*maxDelaySpread)));
  count=count-(number_overlap>0);
  end
  if count<4
  count=0;
  end
  %%%%%%%%%%%%%%%%%%%%%%%%%%%%%%%%
  %%%%%%%%%%%%%%%%%%%%%%%%%%%%%%%%
  %%%%%%%%%%%%%%%%%%%%%%%%%%%
  function plotSSE(user, transmitters, numReceived,
plotRange)
  % Calculate ranges from user to transmitters
  trueRanges=calcRanges(user, transmitters)
  % Calculate all possible permutations of transmitters
  trueRangePerms=npermsk(trueRanges, numReceived);
  transmitterPerms=npermsk(transmitters, numReceived);
  % Create contour map of objective function
  hold off;
  % ezsurf(fh, [0, 100], 150);
  fh=@(x,y) sse(y, x, transmitters, transmitterPerms, trueR-
angePerms);
  h=ezcontourf(fh, plotRange, 150);
  set(h, 'LineStyle', 'none');
  colorbar( )
  colormap([[1 1 1]; jet]);
  view([0 90])
  %%%%%%%%%%%%%%%%%%%%%%%%%%%%%%%%
  %%%%%%%%%%%%%%%%%%%%%%%%%%%%%%%%
  %%%%%%%%%%%%%%%%%%%%%%%%%%
  % Overlap markers representing transmitters onto plot
  function overlayPlotTransmitters(transmitters, numRe-
ceived, z)
  numTransmitters=length(transmitters);
  h=scatter(gca, imag(transmitters), real(transmitters), . . .
  'MarkerFaceColor', 'white', 'MarkerEdgeColor', 'black',
'SizeData', 10^2);
  set(h, 'LineWidth', 3, 'ZData', repmat(z, 1, numTransmit-
ters));
  unreceived=transmitters(numReceived+1:end);
  h=scatter(gca, imag(unreceived), real(unreceived), 'x',
'MarkerEdgeColor', 'red', 'SizeData', 20^2);
  set(h, 'LineWidth', 2, 'ZData', repmat(z, 1, numTransmit-
ters-numReceived));
  %%%%%%%%%%%%%%%%%%%%%%%%%%%%%%%%
  %%%%%%%%%%%%%%%%%%%%%%%%%%%%%%%%
  %%%%%%%%%%%%%%%%%%%%%%%%%%%
  % Overlap markers representing user onto plot
  function overlayPlotUser(user, z)
  h=scatter(gca, imag(user), real(user), '+', 'MarkerEdge-
Color', 'black', 'SizeData', 25^2);
  set(h, 'LineWidth', 3, 'ZData', z);
  h=scatter(gca, imag(user), real(user), '+', 'MarkerEdge-
Color', 'white', 'SizeData', 25^2);
  set(h, 'LineWidth', 2, 'ZData', z);
  %%%%%%%%%%%%%%%%%%%%%%%%%%%%%%%%
  %%%%%%%%%%%%%%%%%%%%%%%%%%%%%%%%
  %%%%%%%%%%%%%%%%%%%%%%%%%%
  % Compute range from user to each transmitter
  function delta=calcRanges(user, transmitters)
  delta=abs(transmitters-repmat(user, 1, length(transmit-
ters)));
  % result=sqrt(sum(delta.^2, 1))
```

```
%%%%%%%%%%%%%%%%%%%%%%%%%%%%%%%
%%%%%%%%%%%%%%%%%%%%%%%%%%%%%%%
%%%%%%%%%%%%%%%%%%%%%%%
% Compute least-squares objective function metric, taking
account all
    % possible permutations of transmitters
    function score=sse(x,y, transmitters, transmitterPerms,
trueRangePerms)
        numReceived=size(transmitterPerms, 2);
        numPerms=size(transmitterPerms, 1);
        % TOA measurement noise, in km
        rmsToaNoise=0.2;
        rmsSseNoise=2*rmsToaNoise^2;
        userRanges=calcRanges(x+y*i, transmitters(1:numReceived));
        userRanges=repmat(userRanges, numPerms, 1);
        % FIXME—Permutations that would result in imaginary
hyperbolas can be discarded
        s=userRanges-trueRangePerms;
        % FIXME—Is there a better choice of reference than the
first receiver?
        s=s-repmat(s(:, 1),1, numReceived);
        t=min(sum(s.^2, 2));
        t=t/(numReceived-1);
        t=t+rmsSseNoise;
        % score=log10(t);
        % Compact magnitude scale to provide detail near SSE
minima
        mmax=10*rmsToaNoise;
        if (t<mmax)
        score=t;
        else
        score=mmax;
        end
%%%%%%%%%%%%%%%%%%%%%%%%%%%%%%%
%%%%%%%%%%%%%%%%%%%%%%%%%%%%%%%
% %%%%%%%%%%%%%%%%%%%%%%%%
    % Compute all permutations of array that are k elements
long
    %
    function result=npermsk(array, k)
        sets=nchoosek(array, k);
        numSets=size(sets, 1);
        c=cell(numSets, 1);
        for i=1:numSets
        c{i}=perms(sets(i,:));
        end
        result=cell2mat(c);
```

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
    a receiver adapted to receive a plurality of single-frequency network (SFN) signals wherein said signals are time-synchronized replica signals, at a predetermined frequency;
    a correlator adapted to correlate the SFN signals with a predetermined reference signal, wherein correlating produces a plurality of correlation peaks;
    a grouper circuit adapted to group the correlation peaks into arrival groups such that the correlation peaks in different arrival groups are known to be from different transmitters; and
    a selection circuit adapted to select the earliest correlation peak in each arrival group as a leading correlation peak.

2. The apparatus of claim 1, further comprising:
    a spread circuit adapted to select an expected maximum channel delay spread for the SFN signals.

3. The apparatus of claim 2:
    wherein the grouper circuit forms the arrival groups by placing the correlation peaks separated by more than twice the expected maximum channel delay spread into separate ones of the arrival groups.

4. The apparatus of claim 1, further comprising:
    a position circuit adapted to determine one or more possible positions of the apparatus based on one or more of the leading correlation peaks.

5. The apparatus of claim 1, further comprising:
    a candidate circuit adapted to identify a plurality of candidate transmitters of the SFN signals; and
    a match circuit adapted to match the leading correlation peaks with the candidate transmitters based on locations of the candidate transmitters.

6. The apparatus of claim 5, further comprising:
    a position circuit to determine one or more possible positions of the apparatus based on an output of the match circuit and the locations of the candidate transmitters.

7. An apparatus comprising:
    means for receiving a plurality of single-frequency network (SFN) signals wherein said signals are time-synchronized replica signals, at a predetermined frequency;

means for correlating the SFN signals with a predetermined reference signal, wherein correlating produces a plurality of correlation peaks;

means for grouping the correlation peaks into arrival groups such that the correlation peaks in different arrival groups are known to be from different transmitters; and means for selecting the earliest correlation peak in each arrival group as a leading correlation peak.

8. The apparatus of claim 7, further comprising:

second means for selecting an expected maximum channel delay spread for the SFN signals.

9. The apparatus of claim 8:

wherein the means for grouping forms the arrival groups by placing the correlation peaks separated by more than twice the expected maximum channel delay spread into separate ones of the arrival groups.

10. The apparatus of claim 7, further comprising:

means for determining one or more possible positions of the apparatus based on one or more of the leading correlation peaks.

11. The apparatus of claim 7, further comprising:

means for identifying a plurality of candidate transmitters of the SFN signals; and means for matching the leading correlation peaks with the candidate transmitters based on locations of the candidate transmitters.

12. The apparatus of claim 11, further comprising:

means for determining one or more possible positions of the apparatus based on an output of the means for matching and the locations of the candidate transmitters.

13. A method comprising:

receiving a plurality of single-frequency network (SFN) signals wherein said signals are time-synchronized replica signals, at a predetermined frequency;

correlating the SFN signals with a predetermined reference signal, wherein correlating produces a plurality of correlation peaks;

grouping the correlation peaks into arrival groups such that the correlation peaks in different arrival groups are known to be from different transmitters; and selecting the earliest correlation peak in each arrival group as a leading correlation peak.

14. The method of claim 13, further comprising:

selecting an expected maximum channel delay spread for the SFN signals.

15. The method of claim 14:

wherein the correlation peaks separated by more than twice the expected maximum channel delay spread are placed into separate arrival groups.

16. The method of claim 13, further comprising:

determining one or more possible positions of an apparatus receiving the SFN signals based on the one or more of the leading correlation peaks.

17. The method of claim 13, further comprising:

identifying a plurality of candidate transmitters of the SFN signals; and matching the leading correlation peaks with the candidate transmitters based on locations of the candidate transmitters.

18. The method of claim 17, further comprising:

determining one or more possible positions of an apparatus receiving the SFN signals based on the matching and the locations of the candidate transmitters.

19. Computer-readable media embodying instructions executable by a computer to perform a method comprising:

correlating a plurality of single-frequency network (SFN) signals wherein said signals are time-synchronized replica signals, received at a predetermined frequency with a predetermined reference signal, wherein correlating produces a plurality of correlation peaks;

grouping the correlation peaks into arrival groups such that the correlation peaks in different arrival groups are known to be from different transmitters; and selecting the earliest correlation peak in each arrival group as a leading correlation peak.

20. The computer-readable media of claim 19, wherein the method further comprises:

selecting an expected maximum channel delay spread for the SFN signals.

21. The computer-readable media of claim 20:

wherein the correlation peaks separated by more than twice the expected maximum channel delay spread are placed into separate arrival groups.

22. The computer-readable media of claim 19, wherein the method further comprises:

determining one or more possible positions of an apparatus receiving the SFN signals based on the one or more of the leading correlation peaks.

23. The computer-readable media of claim 19, wherein the method further comprises:

identifying a plurality of candidate transmitters of the SFN signals; and matching the leading correlation peaks with the candidate transmitters based on locations of the candidate transmitters.

24. The computer-readable media of claim 23, wherein the method further comprises:

determining one or more possible positions of an apparatus receiving the SFN signals based on the matching and the locations of the candidate transmitters.

* * * * *